US009863236B2

(12) United States Patent
Hanak et al.

(10) Patent No.: US 9,863,236 B2
(45) Date of Patent: *Jan. 9, 2018

(54) METHOD FOR LOCATING CASING DOWNHOLE USING OFFSET XY MAGNETOMETERS

(71) Applicants: Francis Chad Hanak, League City, TX (US); Martin Blanz, Celle (DE)

(72) Inventors: Francis Chad Hanak, League City, TX (US); Martin Blanz, Celle (DE)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 848 days.

This patent is subject to a terminal disclaimer.

(21) Appl. No.: 13/944,380

(22) Filed: Jul. 17, 2013

(65) Prior Publication Data
US 2015/0025805 A1 Jan. 22, 2015

(51) Int. Cl.
G01V 11/00 (2006.01)
E21B 47/022 (2012.01)
(Continued)

(52) U.S. Cl.
CPC ............ *E21B 47/0905* (2013.01); *G01V 3/26* (2013.01)

(58) Field of Classification Search
CPC .... E21B 47/0905; E21B 47/022; E21B 44/00; E21B 47/082; G01V 3/26; G01V 3/08; G01V 11/00; G01V 3/28; G01V 5/101; G01V 5/104; G01V 3/15; G01V 3/107; G01N 27/902; G01N 27/82; H01F 21/08; H01F 29/146
See application file for complete search history.

(56) References Cited

U.S. PATENT DOCUMENTS 2,746,550 A * 5/1956 Mitchell, Jr. ........... E21B 19/00
166/255.1
2,770,773 A * 11/1956 Cooley ................... E21B 47/00
324/221
(Continued)

FOREIGN PATENT DOCUMENTS

CA 2369213 A1 * 10/2000 ............. G01N 27/82
GB 2310042 A * 8/1997 ......... E21B 47/0905
(Continued)

OTHER PUBLICATIONS

PCT International Search Report and Written Opinion, International Application No. PCT/US2014/042524; International Filing Date: Jun. 16, 2014; dated: Oct. 20, 2014; pp. 1-17.

*Primary Examiner* — Mohamed Charioui
*Assistant Examiner* — Leonard S Liang
(74) *Attorney, Agent, or Firm* — Cantor Colburn LLP

(57) ABSTRACT

An apparatus, method and computer-readable medium for locating a joint of a casing disposed in a borehole are disclosed. The apparatus includes a sensor oriented in a plane orthogonal to a longitudinal axis of the casing. The sensor measures a magnetic field induced in the casing by the earth's magnetic field. A tool conveys the sensor through the casing along a path that is radially offset from a longitudinal axis of the casing. Transverse magnetic field measurements are obtained by the sensor at a plurality of depths along the casing. A change in the transverse measurements is identified and used to determine the location of the casing joint.

20 Claims, 9 Drawing Sheets

(51) Int. Cl.
*G01V 3/28* (2006.01)
*G01V 3/38* (2006.01)
*E21B 44/00* (2006.01)
*E21B 47/09* (2012.01)
*G01V 3/26* (2006.01)

(56) References Cited

U.S. PATENT DOCUMENTS

| | | | | |
|---|---|---|---|---|
| 2,967,994 | A * | 1/1961 | Peterson | E21B 47/0905 324/221 |
| 3,019,841 | A * | 2/1962 | Ternow | E21B 47/0905 166/65.1 |
| 3,088,068 | A * | 4/1963 | Hall, Jr. | E21B 47/0905 324/221 |
| 3,291,208 | A * | 12/1966 | Kenneday | E21B 43/119 166/254.2 |
| 3,434,046 | A * | 3/1969 | Lorenzino, Jr. | E21B 47/0905 324/221 |
| 3,902,361 | A * | 9/1975 | Watson | E21B 47/09 166/64 |
| 4,491,022 | A * | 1/1985 | de la Cruz | E02D 1/022 73/783 |
| 4,794,336 | A | 12/1988 | Marlow et al. | |
| 4,808,925 | A | 2/1989 | Baird | |
| 4,823,125 | A * | 4/1989 | Rorden | E21B 17/1021 166/250.11 |
| 5,429,190 | A | 7/1995 | Kilgore et al. | |
| 5,712,566 | A * | 1/1998 | Taicher | G01N 24/081 324/303 |
| 5,720,345 | A | 2/1998 | Price et al. | |
| 5,757,186 | A * | 5/1998 | Taicher | G01N 24/081 324/303 |
| 5,959,453 | A * | 9/1999 | Taicher | G01V 3/32 324/303 |
| 6,047,784 | A * | 4/2000 | Dorel | E21B 7/068 175/61 |
| 6,121,773 | A * | 9/2000 | Taicher | G01V 3/32 324/300 |
| 6,145,378 | A * | 11/2000 | McRobbie | E21B 47/00 166/254.1 |
| 6,192,748 | B1 * | 2/2001 | Miller | E21B 7/061 166/117.6 |
| 6,411,084 | B1 | 6/2002 | Yoo | |
| 6,698,516 | B2 | 3/2004 | Van Steenwyk et al. | |
| 6,768,299 | B2 | 7/2004 | Almaguer | |
| 6,815,946 | B2 | 11/2004 | Yoo | |
| 7,095,223 | B2 * | 8/2006 | Yoo | E21B 47/0905 166/255.1 |
| 7,243,719 | B2 * | 7/2007 | Baron | E21B 47/022 166/255.2 |
| 7,260,479 | B2 | 8/2007 | McElhinney | |
| 8,035,374 | B1 * | 10/2011 | Girrell | E21B 47/0905 324/303 |
| 2003/0070806 | A1 | 4/2003 | Connell et al. | |
| 2003/0117134 | A1 * | 6/2003 | Almaguer | G01N 27/82 324/221 |
| 2006/0173626 | A1 | 8/2006 | McElhinney | |
| 2007/0295089 | A1 * | 12/2007 | Velinsky | G01C 17/30 73/514.01 |
| 2009/0070056 | A1 * | 3/2009 | Vocali | G01C 17/28 702/92 |
| 2010/0121599 | A1 * | 5/2010 | Boeve | G01C 17/38 702/93 |
| 2010/0231211 | A1 * | 9/2010 | Edelstein | G01D 1/00 324/244 |
| 2011/0066395 | A1 * | 3/2011 | Judd | G01C 19/56 702/104 |
| 2012/0259579 | A1 * | 10/2012 | Blake | E21B 47/024 702/151 |
| 2013/0049981 | A1 * | 2/2013 | MacPherson | E21B 44/00 340/853.1 |
| 2013/0096835 | A1 * | 4/2013 | Chok | E21B 47/12 702/12 |
| 2013/0264051 | A1 * | 10/2013 | Kyle | E21B 41/00 166/244.1 |
| 2013/0314092 | A1 * | 11/2013 | Shumway | G01V 3/40 324/346 |
| 2014/0111210 | A1 * | 4/2014 | Fang | E21B 47/0905 324/346 |

FOREIGN PATENT DOCUMENTS

| | | | | |
|---|---|---|---|---|
| JP | | 04259872 A | * 9/1992 | |
| WO | | 2007015087 A1 | 2/2007 | |
| WO | WO 2008074161 A1 | * 6/2008 | | G01N 27/902 |

* cited by examiner

METHOD FOR LOCATING CASING DOWNHOLE USING OFFSET XY MAGNETOMETERS

BACKGROUND

1. Field of the Disclosure

The present invention is related to locating casing joints downhole and, in particular, to detecting earth-induced magnetic fields associated with the casing joints.

2. Background of the Art

Forming a casing in a wellbore includes fastening multiple casing tubulars end to end at a downhole location. Once the casing is set in the wellbore, various operations downhole require knowing the location of a casing joint, i.e., a connection between two adjacent casing tubulars. For example, determining the location of the casing joint may be useful to accurately place whipstocks in a cased well so that drilling through the casing joint can be avoided.

One method of locating a casing joint is used on casings with residual magnetic fields therein. The residual magnetic fields are generally the result of magnetic testing of the casing tubulars at an uphole location prior to disposing the casing tubulars in the wellbore. However, casing tubulars that have been de-magnetized or are made of soft magnetic materials do not retain a magnetic field. The material of these non-magnetic tubulars may however be such that a surrounding magnetic field, such as the earth's magnetic field, induces a magnetic field in the casing tubular. However, the character of the magnetic field at the casing joint for a magnetic field induced in the casing tubulars is different from the character of the magnetic field at the casing joint that has a residual magnetic field therein. Therefore, previous magnetic techniques for identifying casing joints are not applicable for casing tubulars having an earth-induced magnetic field.

SUMMARY OF THE DISCLOSURE

In one aspect the present disclosure provides a method of locating a joint of a casing disposed in a borehole that includes: conveying a sensor through the casing along a path radially offset from a longitudinal axis of the casing, wherein the sensor is oriented in a plane orthogonal to the longitudinal axis of the casing; detecting a change in a transverse component of an earth-induced magnetic field in the casing as the sensor is conveyed along the path; and using the detected change in the transverse component to determine a location of the casing joint.

In another aspect, the present disclosure provides an apparatus for locating a casing joint in a casing, the apparatus including: a sensor oriented in a plane orthogonal to a longitudinal axis of the casing, the sensors configured to measure a magnetic field; a tool for conveying the sensor through the casing along a path that is radially offset from a longitudinal axis of the casing; and a processor configured to: receive measurements obtained by the sensor at a plurality of depths along the casing, wherein the measurements are of a transverse component of a magnetic field induced in the casing by the earth, and determine from the received measurements a location of the casing joint.

In yet another aspect, the present disclosure provides a computer-readable medium having accessible to a processor and having a set of instructions stored thereon, wherein the processor accesses the instructions to perform a method for determining a location of a casing joint in a casing in a borehole, the method including: receiving measurements of a transverse component of a magnetic field induced in the casing by an earth's magnetic field using a sensor conveyed through the casing along a path radially offset from a longitudinal axis of the casing, wherein the sensor is oriented in a plane orthogonal to the longitudinal axis of the casing; detecting change in the transverse component along a length of the casing; and determining the location of the casing joint using the detected change in the transverse component.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The disclosure herein is best understood with reference to the accompanying figures in which like numerals have generally been assigned to like elements and in which.

DESCRIPTION OF THE EMBODIMENTS

Figure 1:
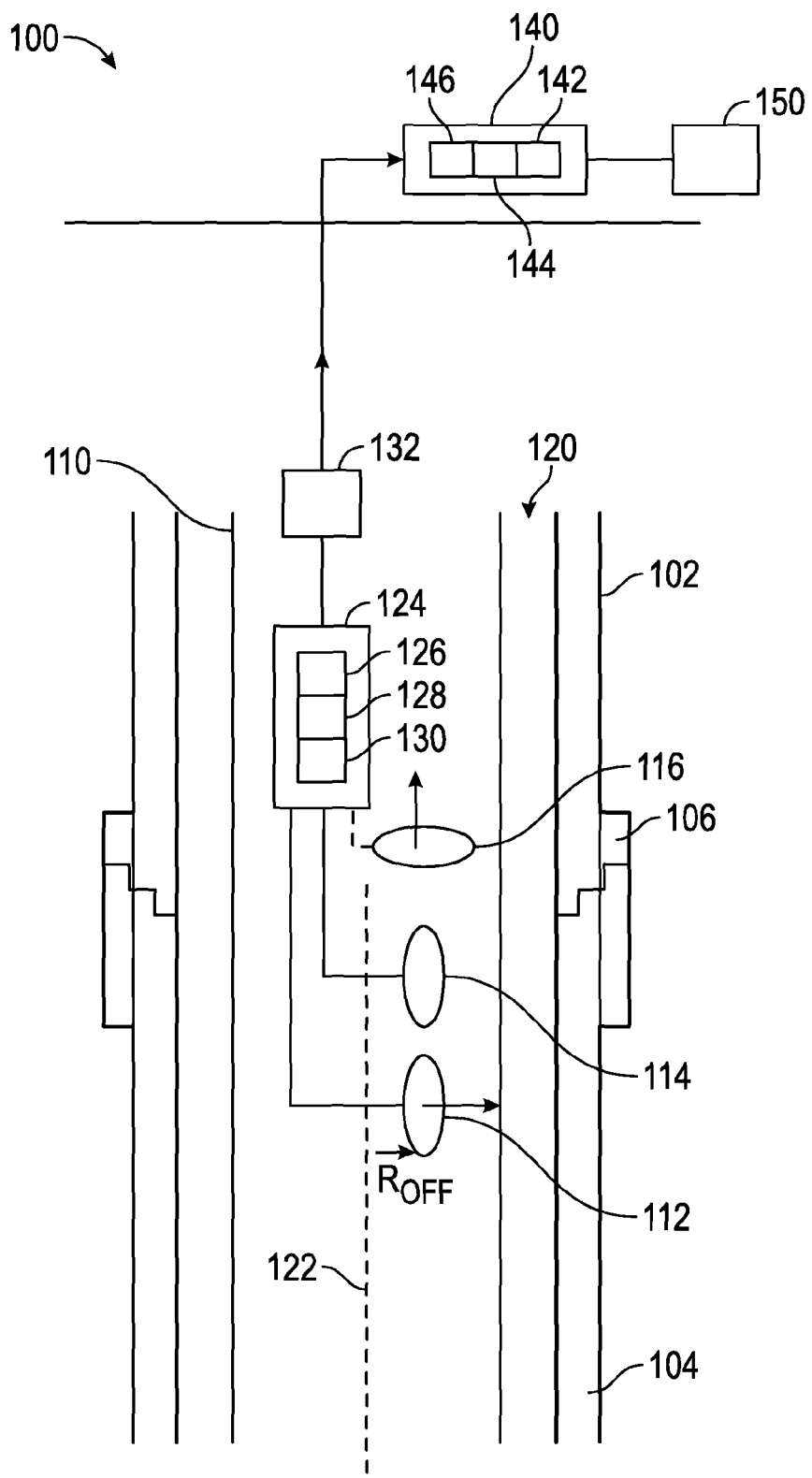
FIG. 1 shows a downhole tool that may be used to determine a location of a casing joint in an exemplary embodiment of the present disclosure.

FIG. 1 shows a downhole tool 110 that may be used to determine a location of a casing joint in an exemplary embodiment of the present disclosure. The downhole tool 110 is conveyed through a casing 100 in a wellbore, wherein the casing 100 may be an assembly of multiple casing tubulars. A segment of the casing 100 is shown at which a first casing tubular 102 is coupled to a second casing tubular 104. In one embodiment, the first casing tubular 102 is fastened to the second casing tubular 104 via a threaded surface on an exterior surface of the first casing tubular 102 and a threaded surface on an interior surface of the second casing tubular 104. In general, the casing tubulars 102, 104 are substantially identical in shape. Therefore, the inner diameter of the first casing tubular 102 is substantially the same as the inner diameter of the second casing tubular 104 and the outer diameter of the first casing tubular 102 is substantially the same as the outer diameter of the second casing tubular 104. The casing joint 106 generally includes a region of the threaded surfaces of the first and second casing tubulars 102, 104.

The casing 100, including the first casing tubular 102 and the second casing tubular 104, may be made of a non-magnetized material or a soft magnetic material and thus does not have a residual magnetic field. The casing 100 may be in a demagnetized state prior to being inserted into the wellbore. The material of the casing 100 may be such that an applied magnetic field proximate the casing induces a magnetic field in the material of the casing and removing the applied magnetic field leaves the casing unmagnetized. Thus, in the downhole environment, the casing 100 has a magnetic field induced therein due to the presence of the earth's magnetic field. In alternate embodiments, the casing may be made of a material capable of retaining a residual or remnant magnetic field once the applied magnetic field is removed. However, methods disclosed herein for locating a casing joint utilize an induced magnetic field in the casing joint rather than a residual or remnant field. The casing 100 is shown in FIG. 1 as being in a vertical well. However, the well may be at any orientation and may lie at any angle with respect to the magnetic field. Various types of casing joints may be used. Flush casing joints have inner and outer diameters that are the same as the inner diameters and outer diameters of the casing tubulars at a location away from the casing joint. Semi-flush casing joints may have an inner diameter that is the same as the inner diameters of the casing tubulars while the outer diameter of the casing joint is greater than the outer diameters of the casing tubulars. Another casing joint may have an inner diameter different than the inner diameters casing tubulars and the outer diameter different than the outer diameters of the casing tubulars. The casing joint 106 shown in FIG. 1 is a semi-flush casing joint.

The exemplary downhole tool 110 includes various sensors or magnetometers $M_x$ 112, $M_y$ 114, and $M_z$ 116 suitable for use in locating a casing joint 106 using the methods disclosed herein. The downhole tool 110 is conveyed through the interior region 120 of the casing 100. In various embodiments, the downhole tool 110 may be part of bottomhole assembly of a drill string and measurements may be obtained and location of casing collars determined without stopping a drilling process. In an exemplary embodiment, the downhole tool 110 may include an x-directed magnetometer ($M_x$) 112 and a y-directed magnetometer ($M_y$) 114 that are oriented in a plane transverse to the longitudinal axis 122 of the downhole tool 110. In one embodiment, one of the magnetometers $M_x$ 112 and $M_y$ 114 may be oriented along a radial line of the casing 100 while the other of the magnetometers $M_x$ 112 and $M_y$ 114 may be oriented in a circumferential direction. In various embodiments, the magnetometers $M_x$ 112 and $M_y$ 114 may be radially offset by a selected offset ($R_{off}$) from the longitudinal axis 122 of the casing 100. In one embodiment, a CoPilot tool of Baker Hughes Incorporated may be used to obtain the $M_x$ and $M_y$ measurements. In various embodiments in which a downhole tool includes magnetometers along a central axis, the downhole tool itself may be offset from the longitudinal axis 122 of the casing so that the magnetometers conveyed therein are offset from the longitudinal axis 122. In various embodiments, the downhole tool may also include a z-directed magnetometer $M_z$ 116 for use in other downhole operations. However, determination of casing locations using the methods disclosed herein employs those magnetometers that are oriented orthogonally to the longitudinal axis 122, such as magnetometers $M_x$ 112 and $M_y$ 114. Additionally, to detect a casing joint 106 when the earth's field is along the longitudinal axis (by measuring the disturbance of the radial component at the casing joint 106), one radial magnetometer offset from the axis may be sufficient. If, however, there is a component of the earth's field that is oriented perpendicular to the longitudinal axis of the casing 100, then two magnetometers $M_x$ 112 and $M_y$ 114 may be used.

Therefore, in one embodiment, the magnetometers $M_x$ 112 and $M_y$ 114 are at a location offset from the longitudinal axis 122 of the casing 100. As the magnetometers $M_x$ 112 and $M_y$ 114 traverse the casing joint 106, at least one of $M_x$ 112 and $M_y$ 114 obtains a measurement of a radial component of the magnetic field that has been induced in the casing 100 by the earth's magnetic field surrounding the casing 100. Measurements made by $M_x$ 112 and $M_y$ 114 may be sent to a processing unit 124 that may include a processor 126, various programs 128 for implementing the methods disclosed herein for determining a location of a casing joint 106, and a memory 130 for storing data. In addition, the downhole tool may include a telemetry unit 132 that may be used to transmit data to a surface location and to receive data from a surface location. The measurements made by $M_x$ 112 and $M_y$ 114 may be sent via the telemetry unit 132 to a processing unit 140 at the surface location that includes processor 142, programs 144 and memory 146 for determining the location of the casing joint 106 at the surface location using the methods disclosed herein. The results of the processing may be sent to a display 150 for viewing by an operator or user.

Figure 2A:
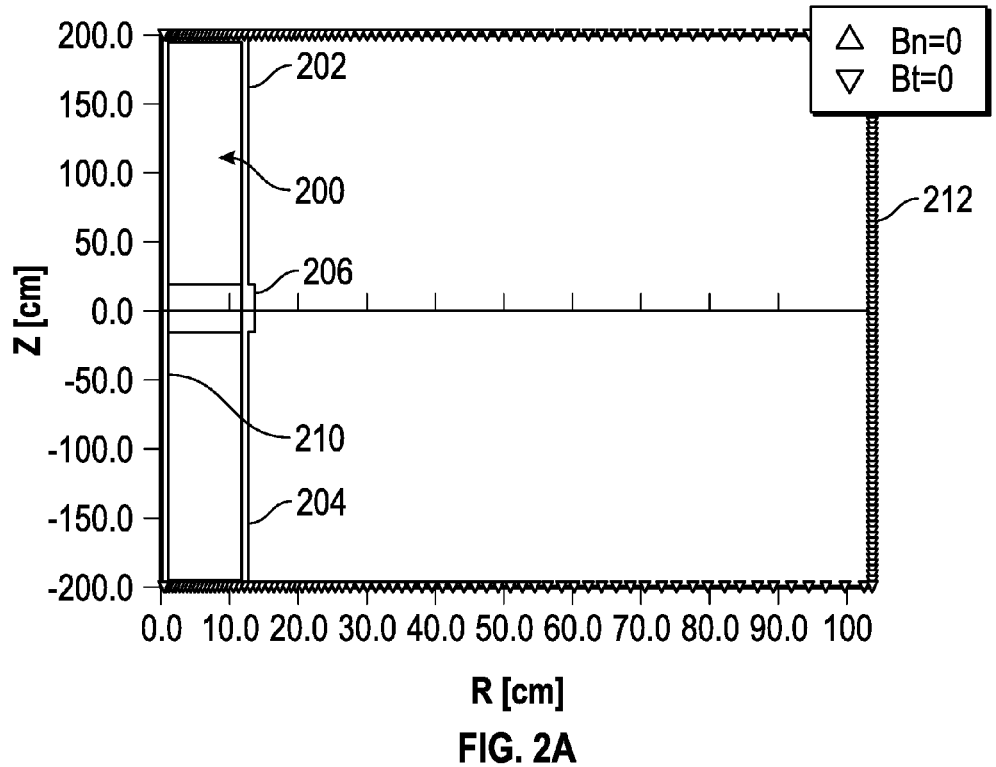
FIGS. 2A and 2B show computer models of an exemplary casing having a magnetic field induced therein.

FIG. 2A shows a computer model of an exemplary casing 200 having a magnetic field induced therein. The exemplary casing 200 includes a first casing tubular 202 and a second casing tubular 204 coupled to each other at casing joint 206. Radial distance (R) is shown along the abscissa and depth (Z) or distance along the casing is shown along the ordinate. The longitudinal axis 210 of the casing 200 is placed at R=0. Due to symmetry of the casing 200, only one half of the casing 200 is shown. The radius of the casing 200 is about 12 centimeters (cm). The casing 200 is centered at Z=0 and extends from a depth of +200 cm to a depth of about −200 cm. The casing joint 206 is also centered at Z=0 and extends from about +18 cm to about −18 cm. The exemplary casing joint 206 is a semi-flush casing joint. Line 212 represents a current-carrying coil that generates a homogeneous magnetic field that simulates a magnetic field of the earth along the length of the casing 200.

Figure 2B:
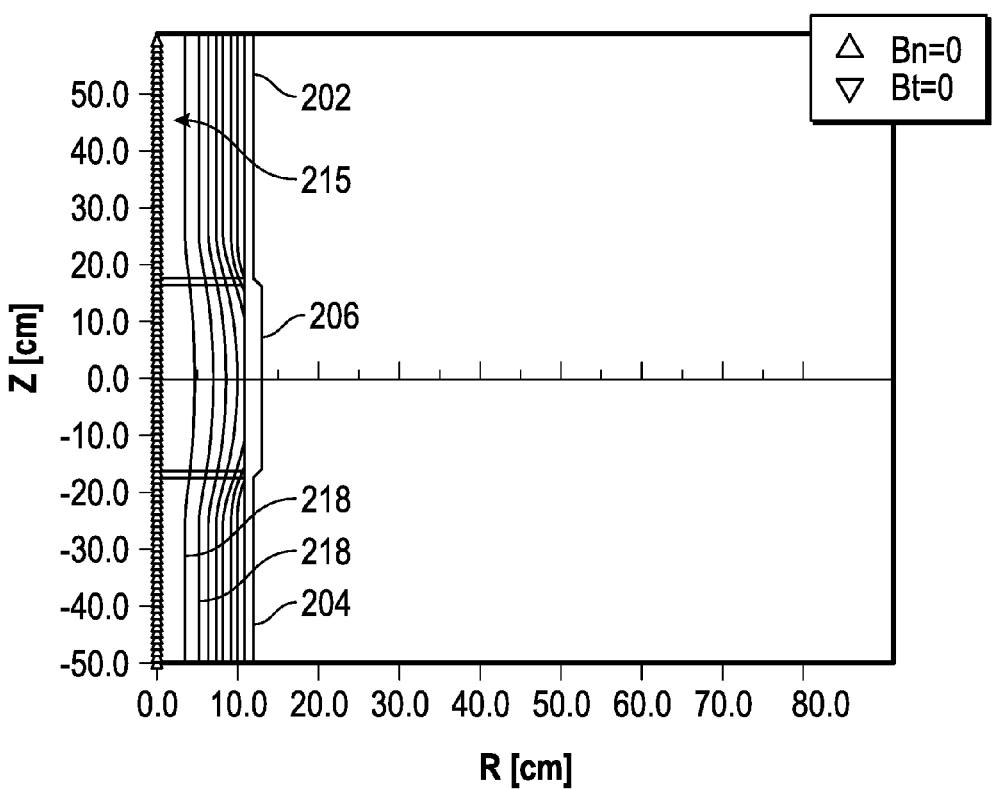

FIG. 2B shows a closer view (from z=−50 cm to z=+50 cm) of the exemplary casing 200 of FIG. 2A showing the effect of the homogenous magnetic field 212 on magnetic field lines 218 within the interior region 215 of the casing. The magnetic field lines 218 are distorted by the presence of the casing joint 206 by being distorted radially outwards from the longitudinal axis. This distortion reduces the z-component ($B_z$) of the magnetic field at the casing joint and produces a measurable signal in the radial component ($B_r$) of the induced magnetic field.

Figure 3:
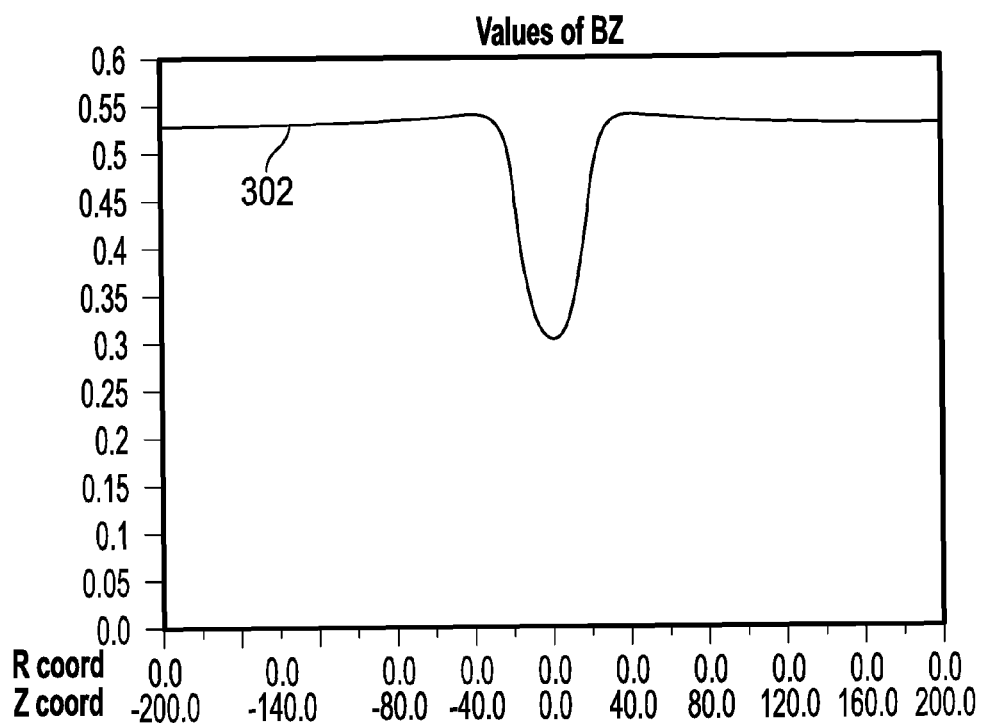
FIG. 3 shows an axial magnetic flux density measured using an axially-oriented magnetometer located along a longitudinal axis of the casing of FIGS. 2A and 2B.

FIG. 3 shows an axial magnetic flux density $B_z$ 302 measured using an axially-oriented magnetometer located along a longitudinal axis of the casing 200. The distance (Z) along the longitudinal axis of the casing 200 is shown along the abscissa and the axial magnetic flux density ($B_z$) is shown along the ordinate. The longitudinal distance extends from about −200 cm to about 200 cm. The axial magnetic flux density ($B_z$) 302 is relatively constant at about 0.53 gauss from Z=−200 cm to about Z=−40 cm and from about Z=+40 cm to about Z=+200 cm. Between about Z=−40 cm and about Z=+40 cm, $B_z$ drops to about 0.3 gauss due to the presence of the casing joint 206.

Figure 4:
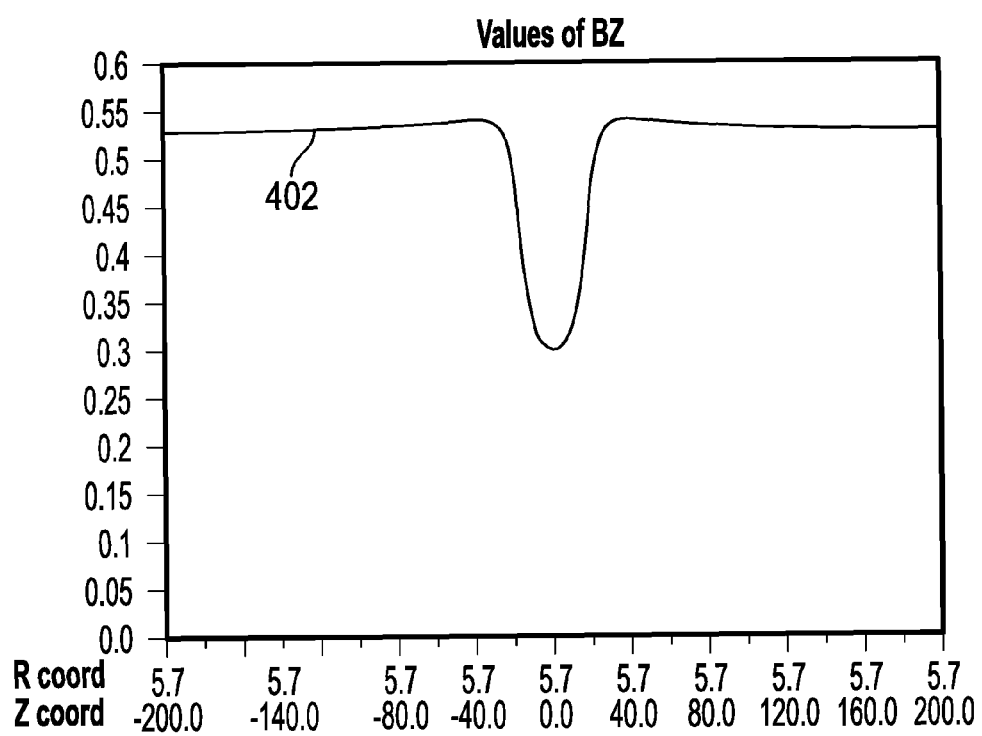
FIG. 4 shows an axial magnetic flux density as measured using an axially-oriented magnetometer located along a line offset from the longitudinal axis of the casing of FIGS. 2A and 2B.

FIG. 4 shows an axial magnetic flux density ($B_z$) 402 as measured using an axially-oriented magnetometer located along a line offset by about 5.7 cm from the longitudinal axis of the casing 200. The measurements of $B_z$ 402 measured at an offset of 5.7 cm from the casing axis is substantially the same as the measurements $B_z$ 302 (FIG. 3) measured along the longitudinal axis. Thus, the radial location of the magnetometer is not a critical parameter in measuring the axial magnetic field.

Figure 5:
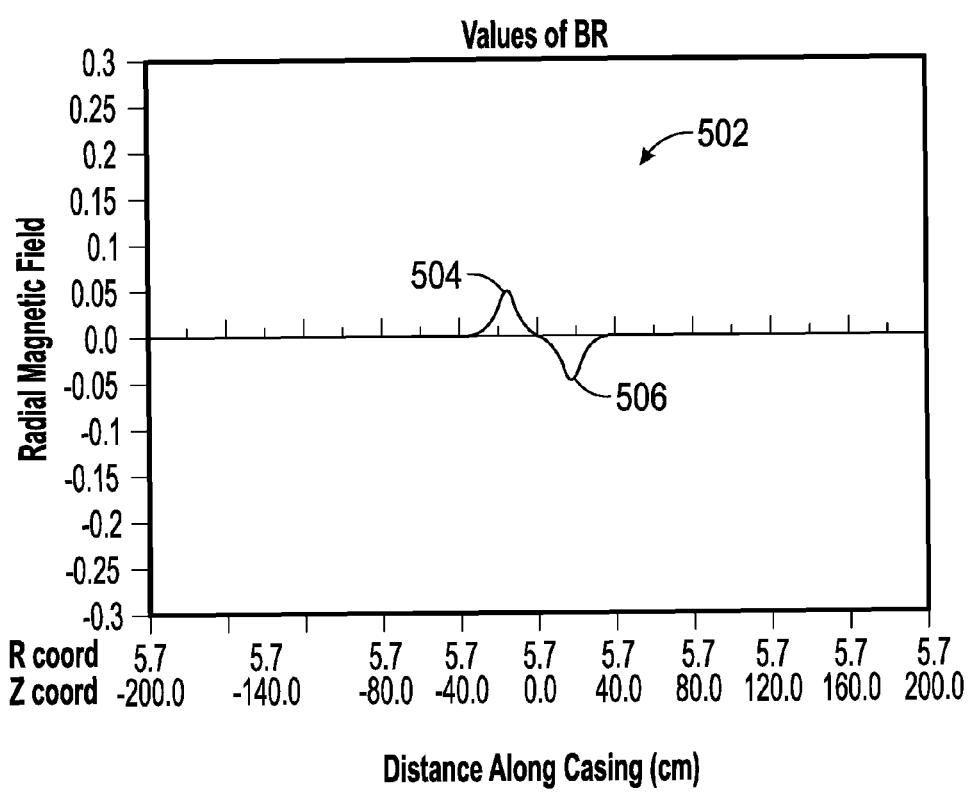
FIG. 5 shows radial magnetic flux density measured using a transverse-oriented magnetometer located along a line offset from the longitudinal axis.

FIG. 5 shows radial magnetic flux density $B_r$ measured using a transverse-oriented magnetometer located along a line offset from the longitudinal axis. The radial offset is about 5.7 cm. The distance along the longitudinal axis of the casing Z is shown along the abscissa and the radial magnetic flux density ($B_r$) is shown along the ordinate. $B_r$ is substantially equal to zero in the regions of the first casing tubular 202 and the second casing tubular 204. However, at the casing joint 206, $B_r$ displays a signature magnetic field 502 indicative of the location of the casing joint 206. The signature magnetic field 502 has a lobe 504 of positive magnetic flux on one half of the casing joint 206 and a lobe 506 of negative magnetic flux on another half of the casing joint 206. The positive lobe 504 occurs over a distance from about −40 cm to about 0 cm and the negative lobe 506 occurs over a distance from about 0 cm to about +40 cm, substantially coinciding with the extent of the casing joint 206. Thus, when the magnetometer oriented along the transverse plane of the casing 200 is offset from the longitudinal axis of the casing 200, it is possible to identify the casing joint 206 by detecting lobes of opposite signs (i.e., lobes 504 and 506) as the magnetometer traverses the casing joint 206. It is noted that due to the symmetry of the casing 200, the radial magnetic field component is zero at the longitudinal axis. Hence, a transverse-oriented magnetometer along the longitudinal axis does not detect any radial magnetic field component.

Figure 6:
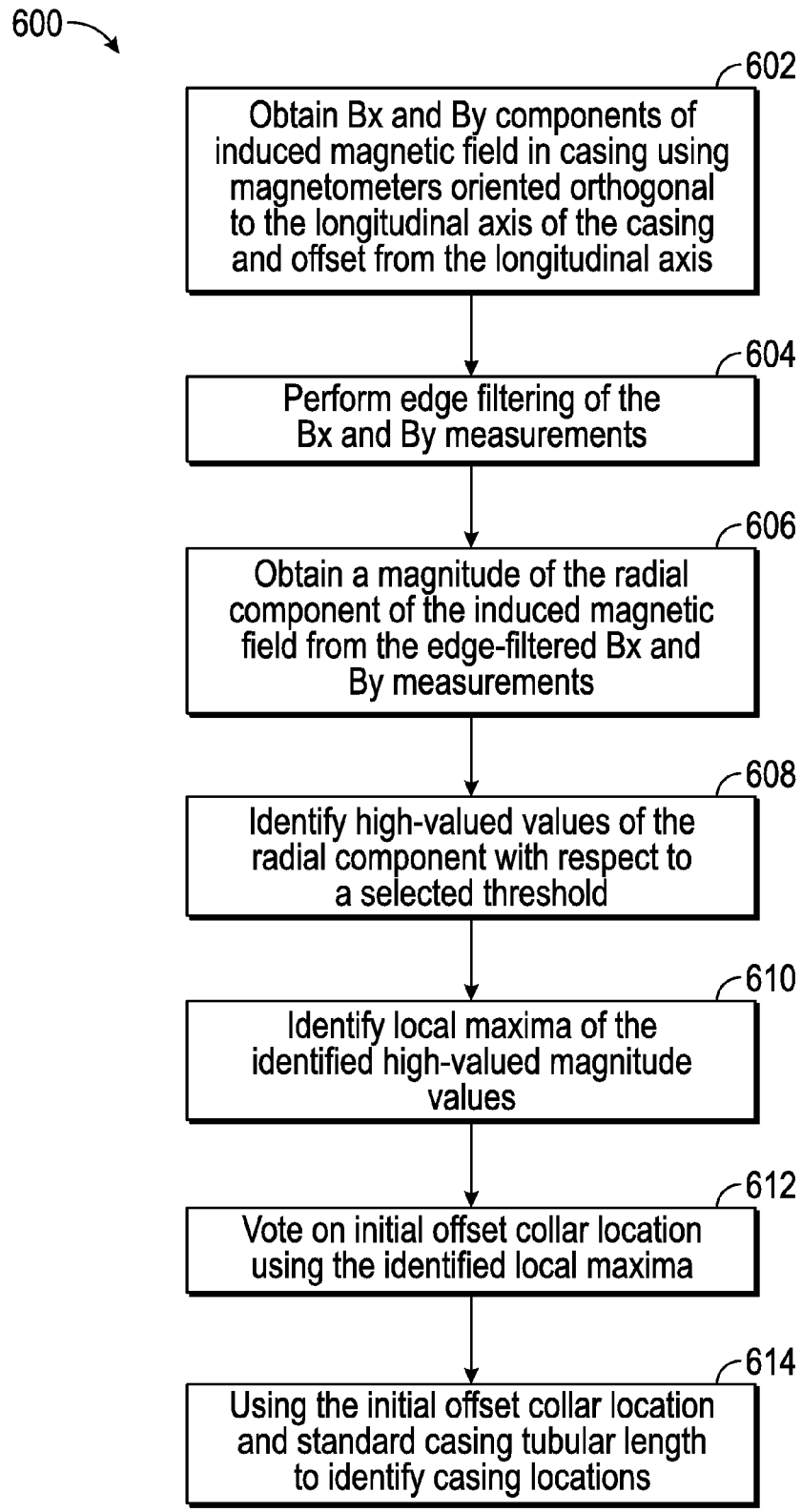
FIG. 6 shows a flowchart illustrating a method of determining a location of a casing joint in one embodiment of the present disclosure.
Figure 7:
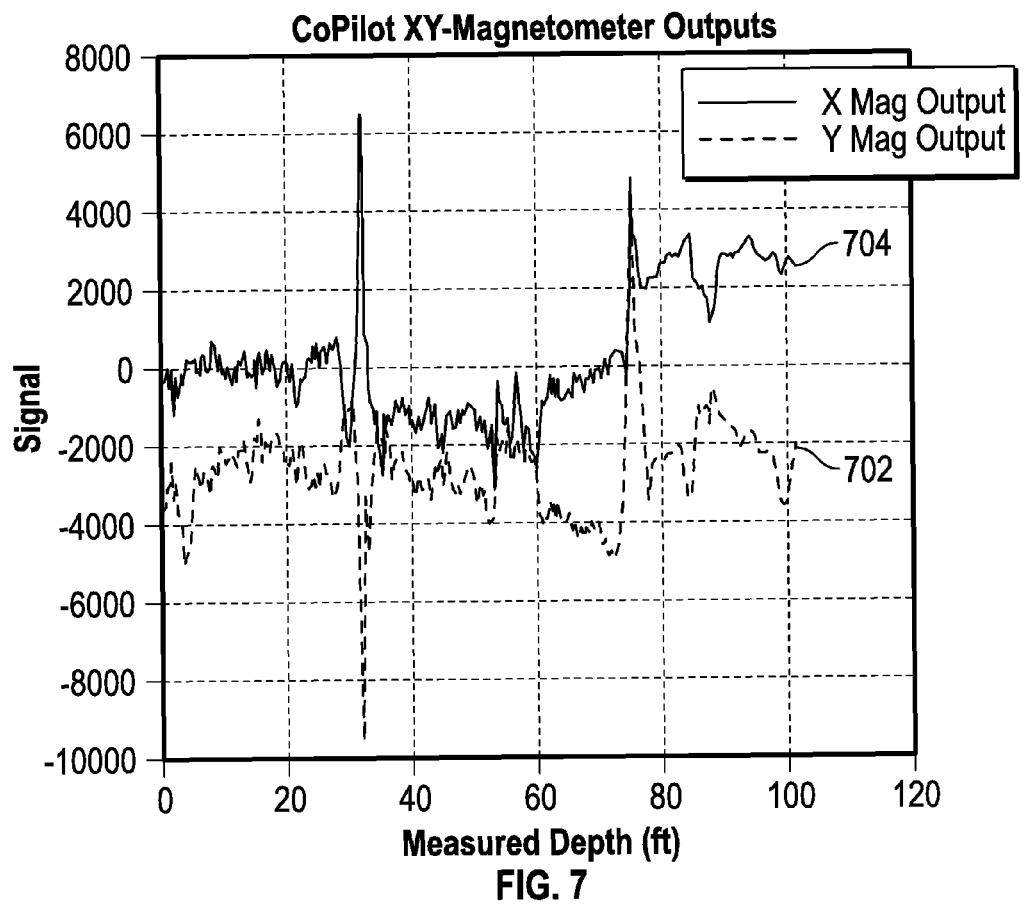
FIG. 7 shows exemplary magnetic signal data taken by transverse-oriented magnetometers over several lengths of a casing.

FIG. 6 shows a flowchart 600 illustrating a method of determining a location of a casing joint in one embodiment of the present disclosure. In block 602, transverse components ($B_x$ and $B_y$) of the induced magnetic field in the casing are obtained using magnetometers $M_x$ and $M_y$ that are in a plane transverse to the longitudinal axis of the casing and offset from the longitudinal axis. FIG. 7 shows exemplary magnetic signal data taken by $M_x$ and $M_y$ magnetometers over several lengths of a casing. Curve 702 shows various noise-like variations of the x-component of the magnetic field as well as spikes in the x-component at about z=32 feet (9.75 meters) and z=75 feet (22.86 meters). Similarly, curve 704 shows various noise-like variations of the y-component of the magnetic field as well as spikes in the y-component at about the same locations.

Figure 8:
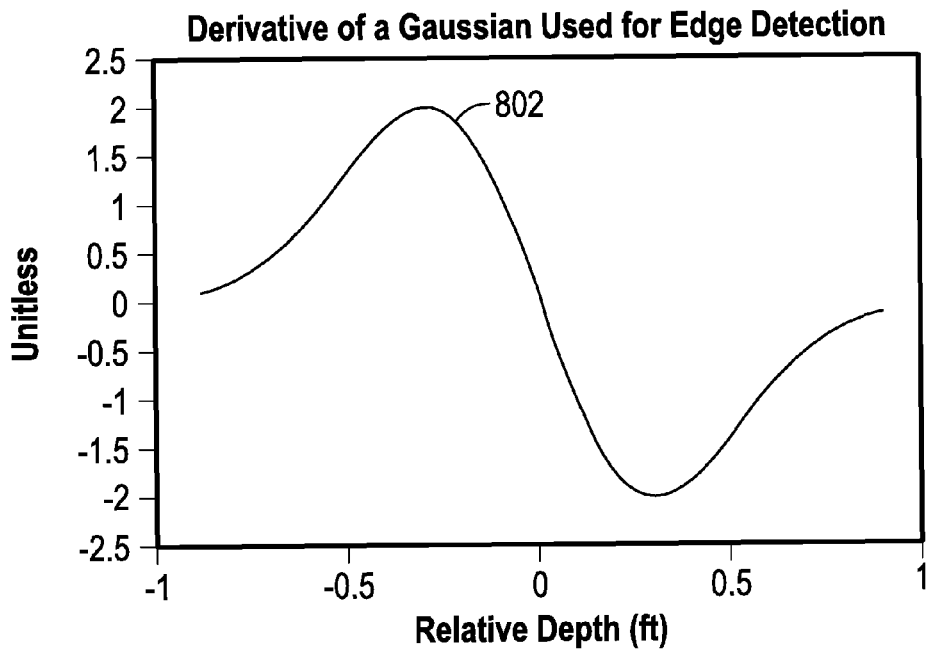
FIG. 8 shows an exemplary edge detection kernel used in edge filtering the magnetic signal data.
Figure 9:
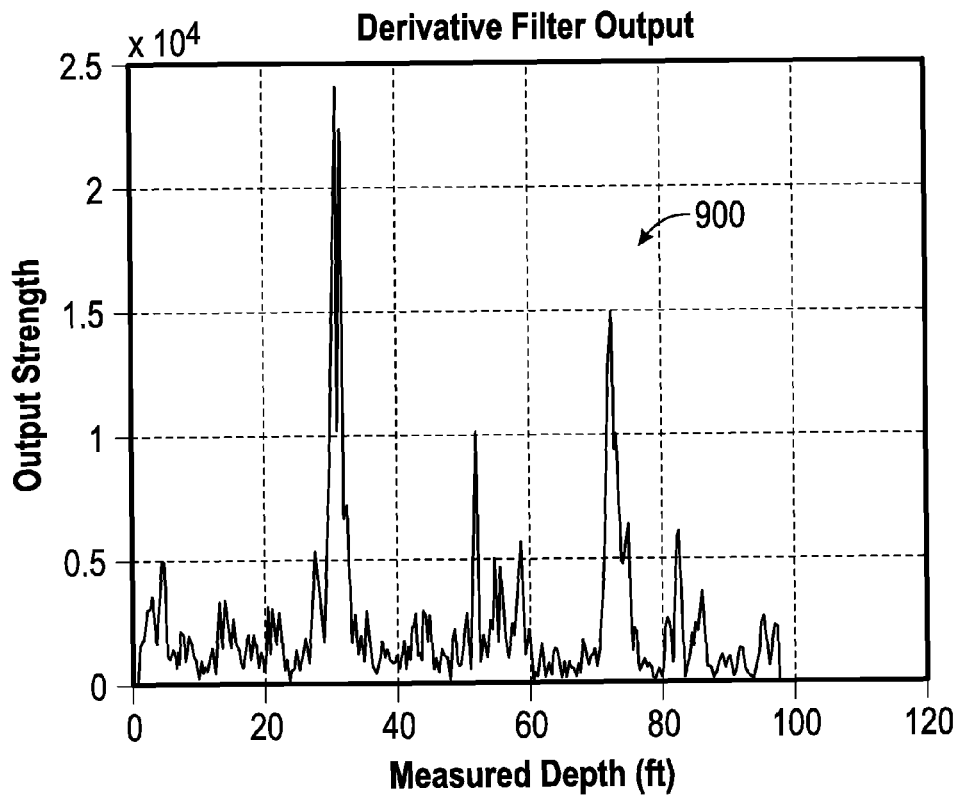
FIG. 9 shows a determined magnitude of the radial component of the edges in the induced magnetic field.

In block 604, the obtained $B_x$ and $B_y$ measurements are edge filtered using an edge filtering kernel. An exemplary edge detection kernel 802 is shown in FIG. 8 and is a derivative of a Gaussian function. The kernel 802 is convolved with the x and y data separately to perform the edge filtering. In block 606, the results of the edge filtering are used to determine a magnitude 900 of the radial component of the edges in the induced magnetic field, as shown in FIG. 9.

Figure 10:
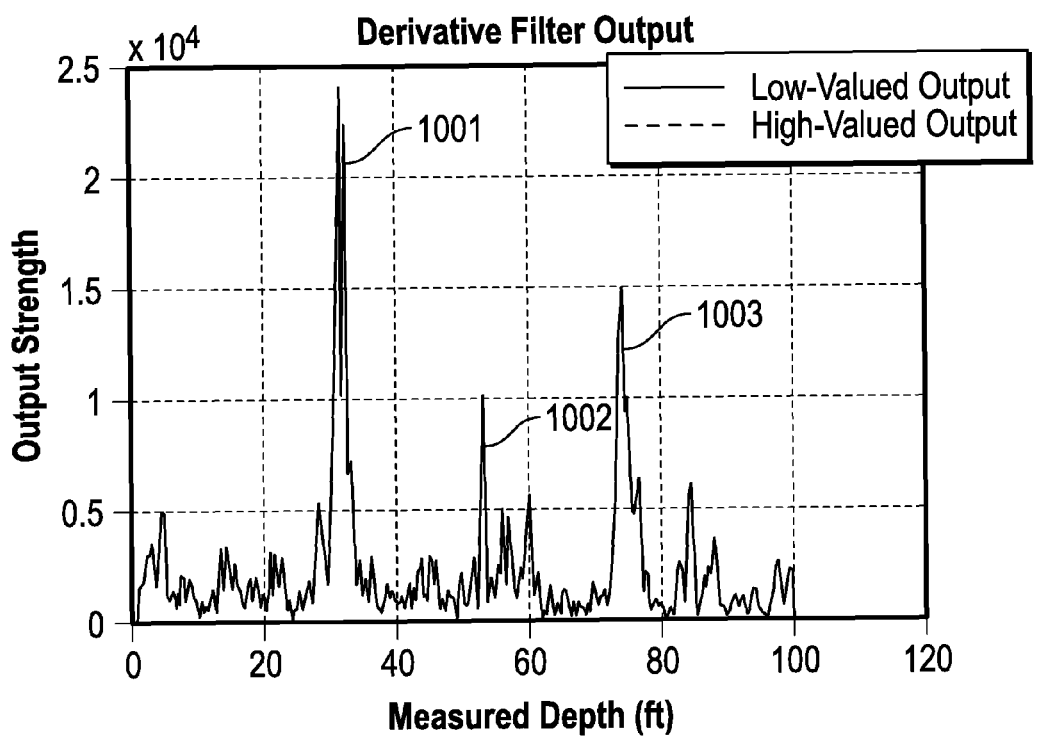
FIG. 10 shows clustered magnitude values of the radial component of the edges in the induced magnetic field obtained using a k-means clustering algorithm.
Figure 11:
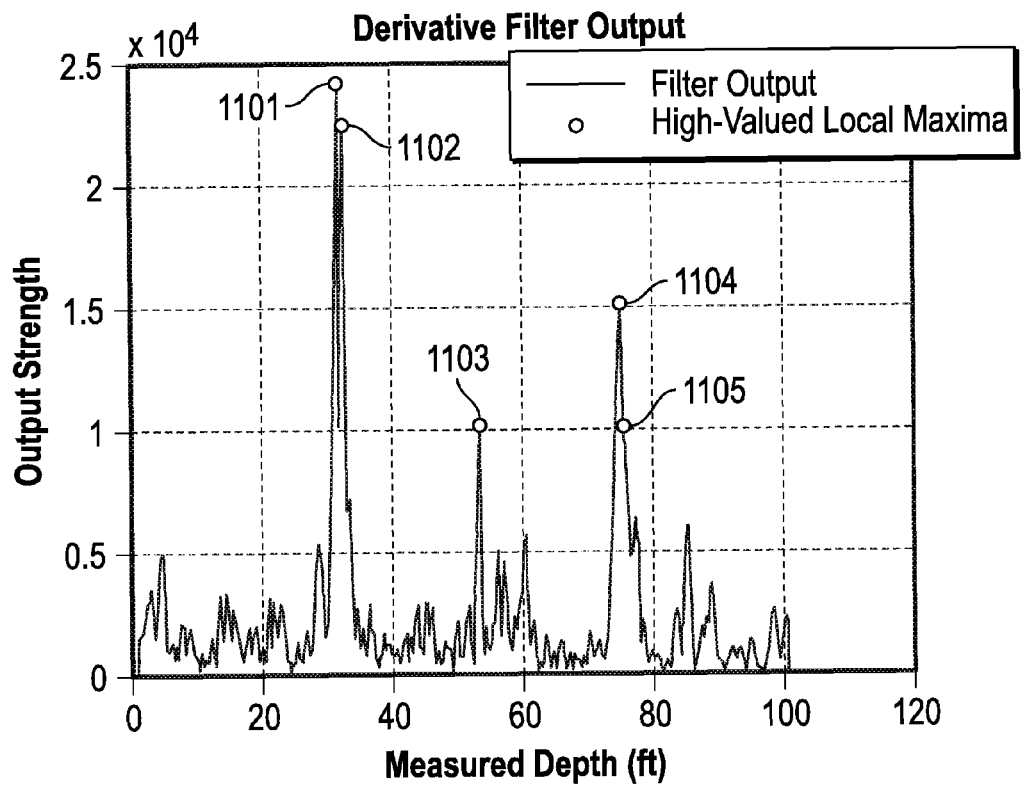
FIG. 11 shows determined local maxima of the clustered magnitude values.

In block 608 the magnitude values are clustered into high-valued and low-valued points via a k-means clustering algorithm, as shown in the selection of high-valued output values 1001-1003 of FIG. 10. The high-valued output 1001-1003 generally includes data having an output strength above a selected threshold value. In block 610, local maxima of the high-valued magnitude values are determined. FIG. 11 shows determined local maxima 1101-1105. The determined local maxima 1101-1105 identify potential locations of casing collars.

Figure 12:
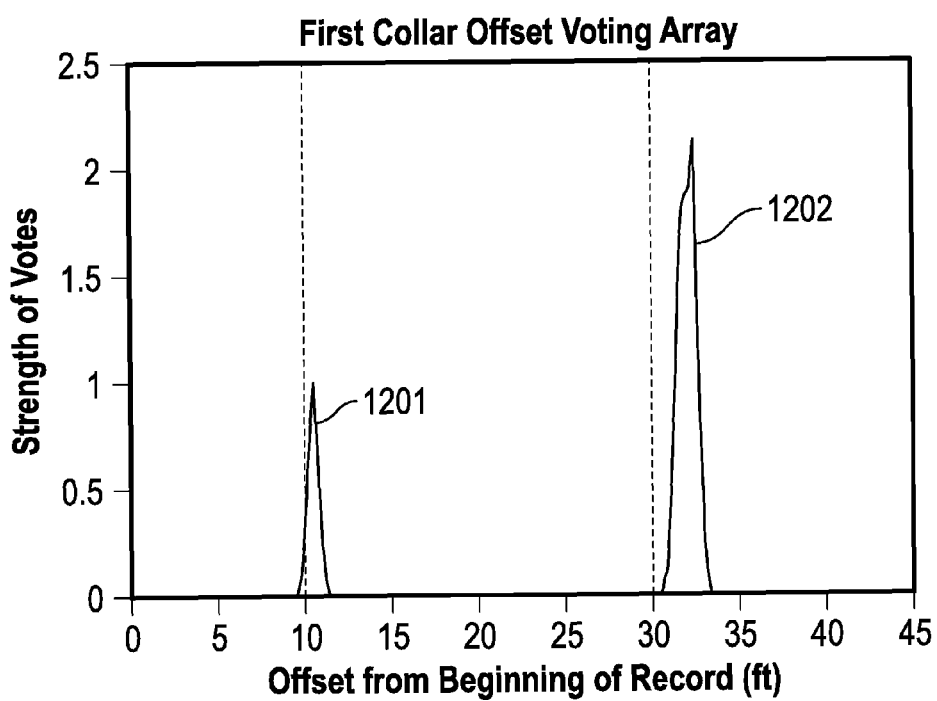
FIG. 12 shows result of voting using the exemplary identified local maximum of FIG. 11.
Figure 13:
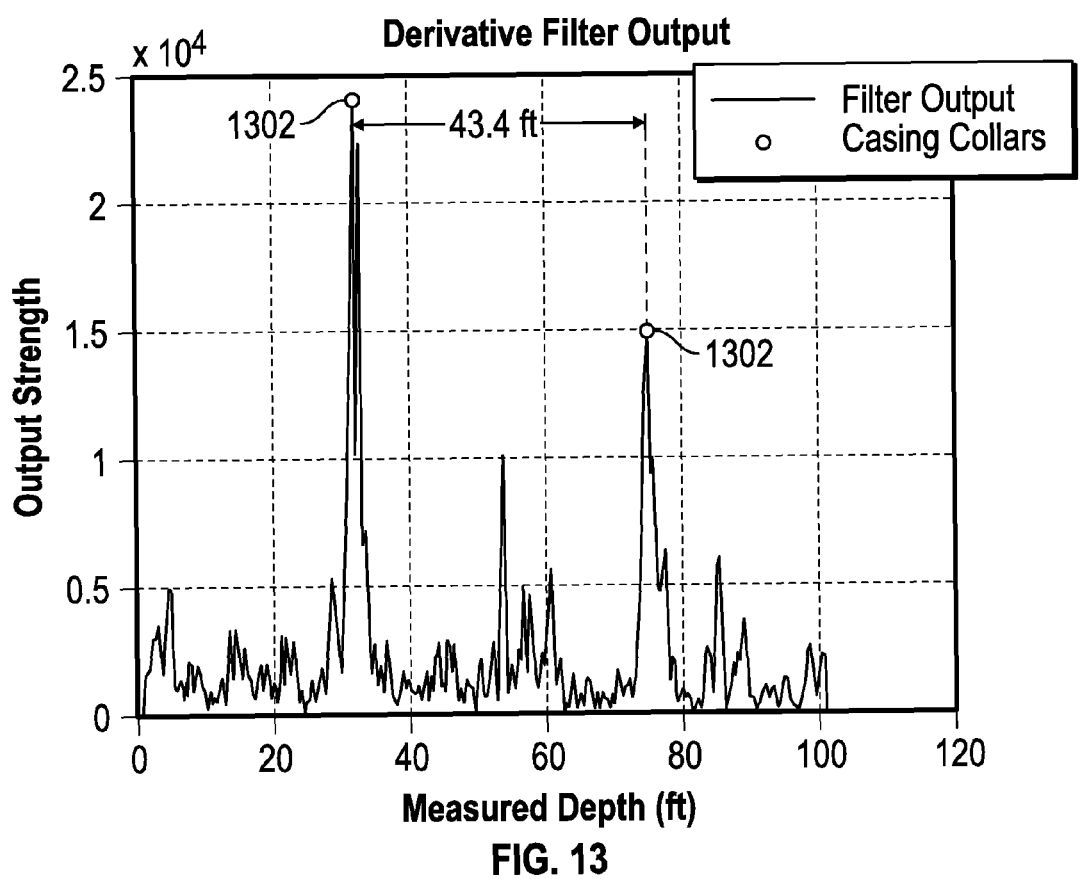
FIG. 13 shows locations of casing joints that are determined using the selected initial casing joint obtained from voting and a standard casing length.

In block 612, the identified potential collar locations are used to "vote" on an initial collar offset location. The voting may be performed by subtracting a multiple of the casing lengths from each potential collar location to obtain a location at a depth that is the least such depth that is greater than an initial depth. Once the voted-for location is identified, this location is marked using a voting array that may include a plurality of location bins. Bins surrounding this voted-for location are incremented to record the vote and may be incremented using a Gaussian weighting function due to the fact that collar locations are generally not determined exactly. FIG. 12 shows result of voting using the exemplary identified local maximum 1101-1105 of FIG. 11 and the method of block 612. Two voted-for locations (peaks) 1201 and 1202 are shown. The peak 1202 with the maximum value is chosen as the location of the first casing joint within the wellbore. The selected location of the first casing joint occurs at about 32.4 feet (about 10 meters). In block 614, the location of other casing joints are determined using the selected first casing joint in the casing and a standard length of a casing tubular, as shown by locations 1301 and 1302 of FIG. 13.

Therefore, in one aspect the present disclosure provides a method of locating a joint of a casing disposed in a borehole that includes: conveying a sensor through the casing along a path radially offset from a longitudinal axis of the casing, wherein the sensor is oriented in a plane orthogonal to the longitudinal axis of the casing; detecting a change in a transverse component of an earth-induced magnetic field in the casing as the sensor is conveyed along the path; and using the detected change in the transverse component to determine a location of the casing joint. The offset path may be near an inner surface of the casing. The sensor may include two orthogonal magnetometers oriented in a plane orthogonal to the longitudinal axis of the casing. The transverse component of the earth-induced magnetic field may be a radial component of the earth-induced magnetic field in the casing. In one embodiment, a signature of the transverse component of the earth-induced magnetic field is detected to determine the location of the casing joint. The signature may include a radially positive magnetic lobe and a radially negative magnetic lobe at the casing joint. In another embodiment, the method may include using a k-means clustering of edge-filtered magnetic measurements to select a plurality of potential casing joint locations, voting for an initial casing joint location using the potential casing joint locations and determining the casing joint locations from the voted-for initial casing joint location and a known casing length.

In another aspect, the present disclosure provides an apparatus for locating a casing joint in a casing, the apparatus including: a sensor oriented in a plane orthogonal to a longitudinal axis of the casing, the sensors configured to measure a magnetic field; a tool for conveying the sensor through the casing along a path that is radially offset from a longitudinal axis of the casing; and a processor configured to: receive measurements obtained by the sensor at a plurality of depths along the casing, wherein the measurements are of a transverse component of a magnetic field induced in the casing by the earth, and determine from the received measurements a location of the casing joint. The radially offset path may be a path near an inner surface of the casing. The transverse component of the magnetic field may be a radial component of the magnetic field. The processor may be further configured to determine a signature of the transverse component of the magnetic field induced in the casing by the earth's magnetic field. The signature may include a radially positive magnetic lobe and a radially negative magnetic lobe at the casing joint. In one embodiment, processor may apply a k-means clustering of edge-filtered magnetic measurements to select a plurality of potential casing joint location, vote for an initial casing joint location using the potential casing joint locations, and determine the casing joint locations from the voted-for initial casing joint location and a known casing length. In various embodiments, the location of the casing joint may be determined without the use of a longitudinal component of the induced magnetic field in the casing.

In yet another aspect, the present disclosure provides a computer-readable medium accessible to a processor and having a set of instructions stored thereon, wherein the processor accesses the instructions to perform a method for determining a location of a casing joint in a casing in a borehole, the method including: receiving measurements of a transverse component of a magnetic field induced in the casing by an earth's magnetic field using a sensor conveyed through the casing along a path radially offset from a longitudinal axis of the casing, wherein the sensor is oriented in a plane orthogonal to the longitudinal axis of the casing; detecting change in the transverse component along a length of the casing; and determining the location of the casing joint using the detected change in the transverse component. Receiving measurements may include receiving measurement from two orthogonal magnetometers oriented in the plane orthogonal to the longitudinal axis of the casing. The transverse component of the earth-induced magnetic field is a radial component. The method may further include detecting a signature of the transverse component of the earth-induced magnetic field at the casing joint to determine the location of the casing joint. The signature of the earth-induced magnetic field may include a radially positive magnetic lobe and a radially negative magnetic lobe at the casing joint. The method may further include using a k-means clustering of edge-filtered magnetic measurements to select a plurality of potential casing joint locations, voting for an initial casing joint location using the potential casing joint locations and determining the casing joint locations from the voted-for initial casing joint location and a known casing length.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

The invention claimed is:

1. A method of locating a joint of a casing disposed in a borehole, comprising:
conveying two sensors through the casing made of a soft magnetic material along a single longitudinal path radially offset from a longitudinal axis of the casing, wherein the two sensors are oriented in a plane orthogonal to the longitudinal axis of the casing, a first of the two sensors being oriented along a radial line of the casing and a second of the two sensors being oriented along a circumferential direction;
detecting by the two sensors a change in a transverse component of an earth-induced magnetic field in the casing as the two sensors are conveyed along the path;
locating the casing joint using the detected change in the transverse component; and
performing an operation in the casing based on the location of the joint.

2. The method of claim 1, wherein the offset path is near an inner surface of the casing.

3. The method of claim 1, wherein the two sensors include two orthogonal magnetometers oriented in a plane orthogonal to the longitudinal axis of the casing.

4. The method of claim 1, wherein the transverse component of the earth-induced magnetic field is a radial component.

5. The method of claim 1, further comprising detecting a signature of the transverse component of the earth-induced magnetic field to determine the location of the casing joint.

6. The method of claim 5, wherein the signature of the earth-induced magnetic field includes a radially positive magnetic lobe and a radially negative magnetic lobe at the casing joint.

7. The method of claim 1, further comprising using a k-means clustering of edge-filtered magnetic measurements to select a plurality of potential casing joint locations, voting for an initial casing joint location using the potential casing joint locations and determining the casing joint locations from the voted-for initial casing joint location and a known casing length.

8. An apparatus for locating a casing joint in a casing, comprising:
two sensors oriented in a plane orthogonal to a longitudinal axis of the casing made of soft magnetic material, the sensors configured to measure a magnetic field, wherein a first of the two sensors is oriented along a radial line of the casing and a second of the two sensors is oriented along a circumferential direction;
a tool for conveying the sensors through the casing along a single longitudinal path that is radially offset from a longitudinal axis of the casing; and
a processor configured to:
receive measurements obtained by the two sensors at a plurality of depths along the casing, wherein the measurements are of a transverse component of a magnetic field induced in the casing by the earth,
locate the casing joint using the received measurements, and
perform an operation in the casing based on the location of the joint.

9. The apparatus of claim 8, wherein the radially offset path is near an inner surface of the casing.

10. The apparatus of claim 8, wherein the transverse component of the magnetic field is a radial component of the magnetic field.

11. The apparatus of claim 8, wherein the processor is configured to determine a signature of the transverse component of the magnetic field induced in the casing by the earth's magnetic field.

12. The apparatus of claim 11, wherein the signature includes a radially positive magnetic lobe and a radially negative magnetic lobe at the casing joint.

13. The apparatus of claim 8, wherein the processor is further configured to apply a k-means clustering of edge-filtered magnetic measurements to select a plurality of potential casing joint locations, vote for an initial casing joint location using the potential casing joint locations, and determine the casing joint locations from the voted-for initial casing joint location and a known casing length.

14. The apparatus of claim 8, wherein the processor is further configured to determine the location of the casing joint without the use of a longitudinal component of the induced magnetic field in the casing.

15. A non-transitory computer-readable medium containing computer instructions stored therein for causing a computer processor to perform a method for determining a location of a casing joint in a casing in a borehole, the method comprising:

receiving measurements of a transverse component of a magnetic field induced in the casing made of soft magnetic material by an earth's magnetic field using two sensors conveyed through the casing along a single longitudinal path radially offset from a longitudinal axis of the casing, wherein the two sensors are oriented in a plane orthogonal to the longitudinal axis of the casing, a first of the two sensors being oriented along a radial line of the casing and a second of the two sensors being oriented along a circumferential direction;

detecting a change in the transverse component along a length of the casing;

determining the location of the casing joint using the detected change in the transverse component; and performing an operation in the casing based on the location of the casing joint.

16. The computer-readable medium of claim 15, wherein receiving measurements further comprises receiving measurements from two orthogonal magnetometers oriented in the plane orthogonal to the longitudinal axis of the casing.

17. The computer-readable medium of claim 15, wherein the transverse component of the earth-induced magnetic field is a radial component.

18. The computer-readable medium of claim 15, wherein the method further comprises detecting a signature of the transverse component of the earth-induced magnetic field at the casing joint to determine the location of the casing joint.

19. The computer-readable medium of claim 18, wherein the signature of the earth-induced magnetic field includes a radially positive magnetic lobe and a radially negative magnetic lobe at the casing joint.

20. The computer-readable medium of claim 15, wherein the method further comprises using a k-means clustering of edge-filtered magnetic measurements to select a plurality of potential casing joint locations, voting for an initial casing joint location using the potential casing joint locations and determining the casing joint locations from the voted-for initial casing joint location and a known casing length.

* * * * *